Figures 1, 10:
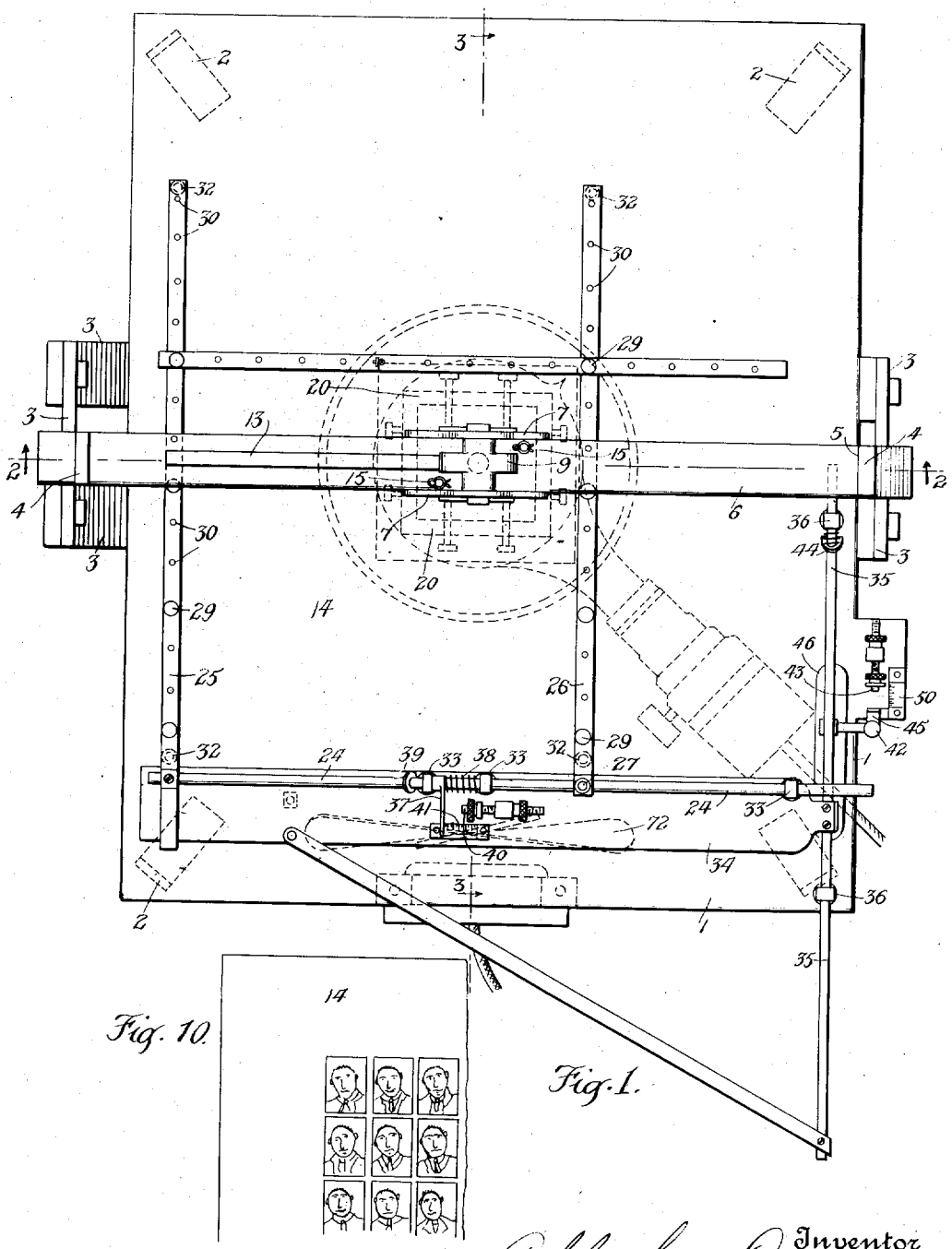

A. G. OGDEN.

PRINTING DEVICE.

APPLICATION FILED JULY 21, 1917.

Reissued Sept. 3, 1918.

14,517.

3 SHEETS—SHEET 1.

Ashley Guy Ogden Inventor

By his Attorneys

Williams & Pritchard

A. G. OGDEN.
PRINTING DEVICE.
APPLICATION FILED JULY 21, 1917
Reissued Sept. 3, 1918.
14,517.
3 SHEETS—SHEET 2.
Fig. 2.
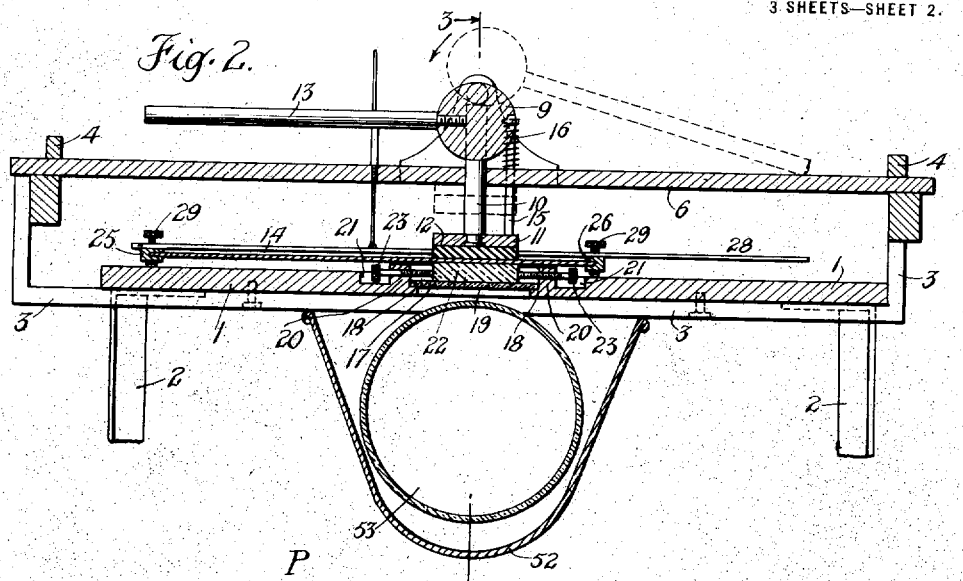
Fig. 11.
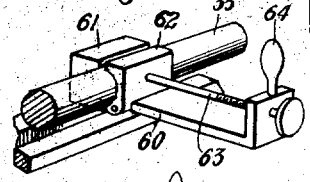
Fig. 12.
Fig. 13.
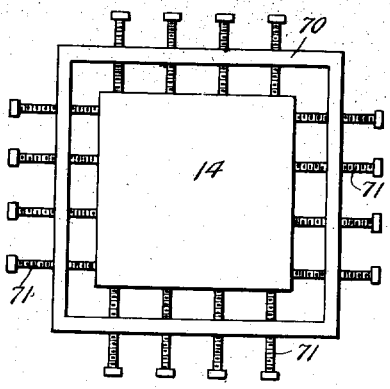
Fig. 3.
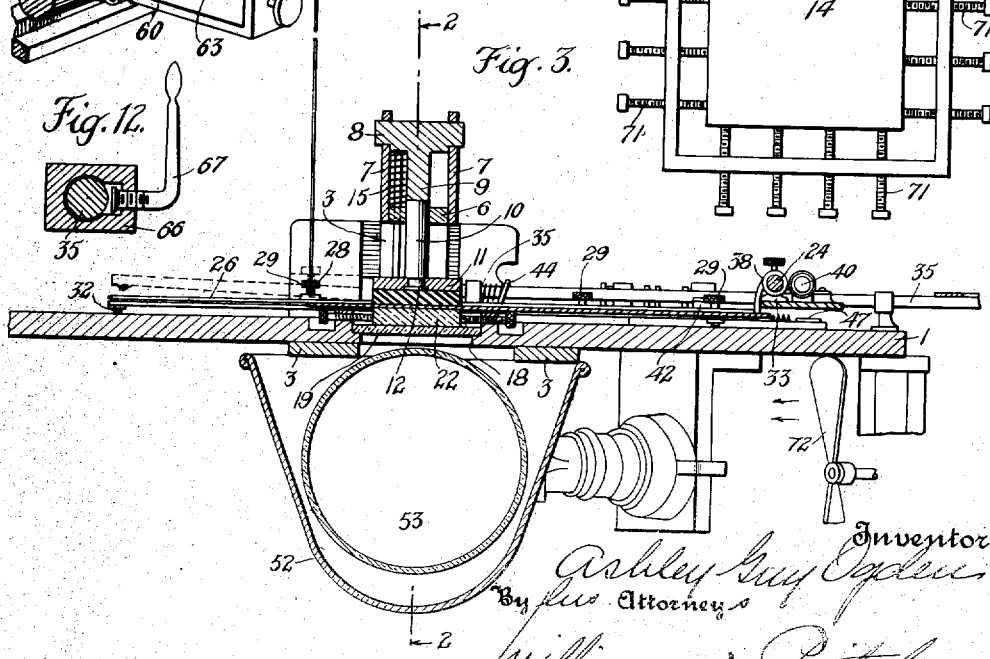
Inventor
Ashley Guy Ogden
By his Attorneys
Williams & Pritchard A. G. OGDEN.
PRINTING DEVICE.
APPLICATION FILED JULY 21, 1917.
Reissued Sept. 3, 1918.
14,517.
3 SHEETS—SHEET 3.
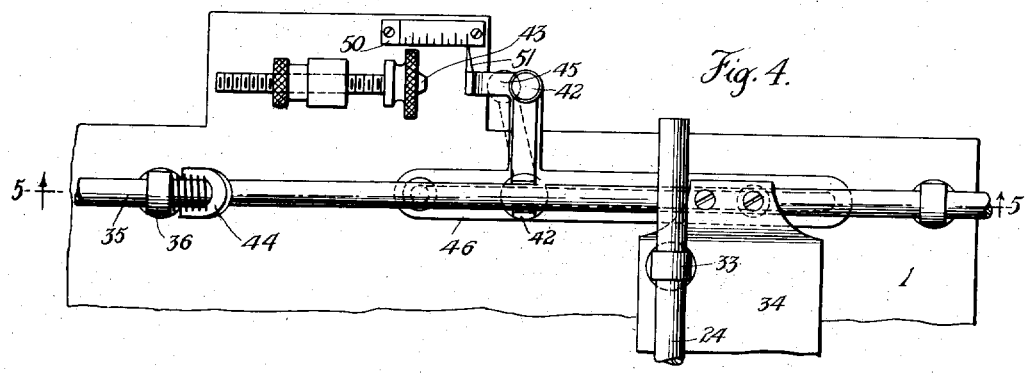
Fig. 4.
Fig. 5.
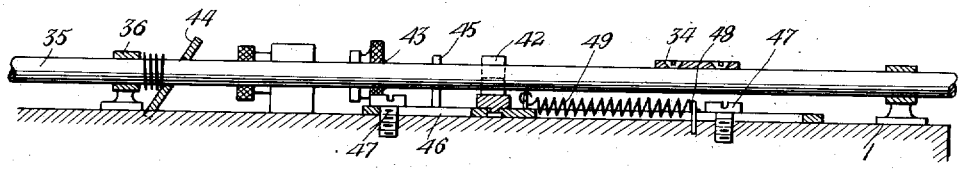
Fig. 6.
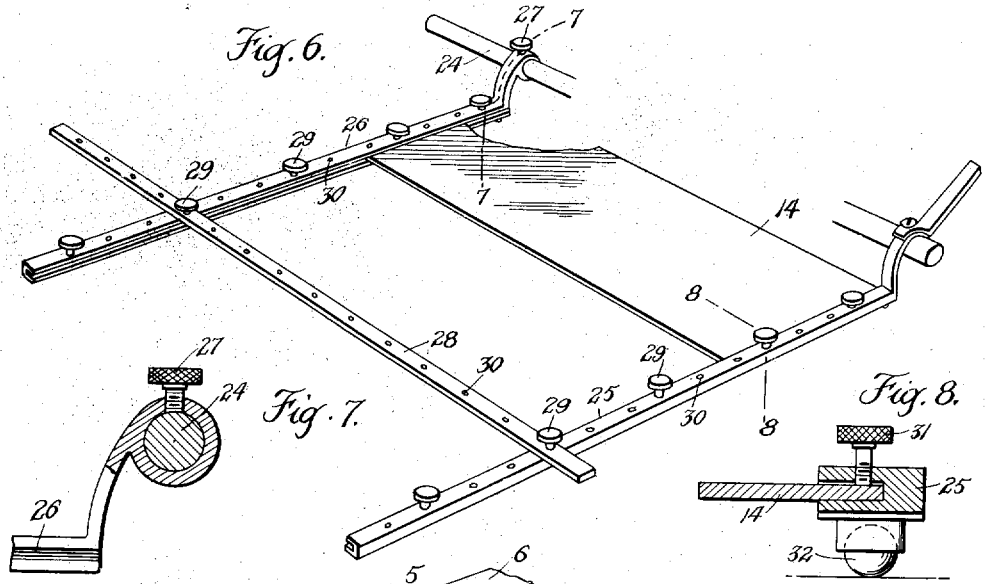
Fig. 7.
Fig. 8.
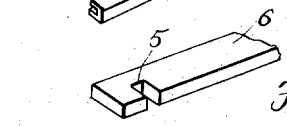
Fig. 9.
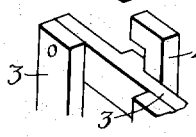
Ashley Guy Ogden Inventor
By his Attorneys
Williams & Pritchard

UNITED STATES PATENT OFFICE.

ASHLEY GUY OGDEN, OF BALTIMORE, MARYLAND, ASSIGNOR TO THE MULTIPLE OFFSET MACHINE COMPANY, INC., OF BALTIMORE, MARYLAND.

PRINTING DEVICE.

14,517. Specification of Reissued Letters Patent. Reissued Sept. 3, 1918.

Original No. 1,192,675, dated July 25, 1916, Serial No. 37,524, filed July 1, 1915. Application for reissue filed July 21, 1917. Serial No. 182,085.

*To all whom it may concern:*

Be it known that I, ASHLEY GUY OGDEN, a citizen of the United States, residing at Baltimore, in the State of Maryland, have invented certain new and useful Improvements in Printing Devices, of which the following is a specification.

My invention relates to printing devices for reproducing a multiplicity of prints arranged in symmetrical relation, from a single negative.

An object of my invention is to provide an improved device whereby a multiplicity of prints may be made on a sensitized plate in a minimum of time.

A further object of my invention is to provide a device of the type described in which the prints are made in such manner that the designs are accurately spaced in symmetrical relation so that when the designs are etched and are transferred to a plate or sheet, the latter may be punched accurately.

A further object of my invention is to provide a device of the type described in which the negative is held in a fixed position, while the plate which is to be printed is shifted with respect to the negative. Where the negative is shifted with respect to the plate, then the source of light which is usually an electric light, must be shifted with it and this necessitates the use of flexible wires or conductors which are in the way, or the provision of special means for maintaining electrical connection to the source of light during the movement of the latter.

A further object of the invention is to provide a device of the type described in which the source of light and the negative are held stationary while novel means are employed for moving the sensitive plate and for clamping the same in its shifted positions.

A further object of the invention is to provide for successively making multiple duplicate prints on a sensitized plate without recourse to a dark-room to protect the plate from improper exposure, and without recourse to any supplemental precautions or means extraneous to the device itself.

Other objects and advantages will appear in the following specification and the novel features of the invention will be particularly pointed out in the appended claims.

My invention is illustrated in the accompanying drawings forming part of this application, in which—

Figure 1 is a plan view of the device. Fig. 2 is a section along the line 2—2 of Figs. 1 and 3. Fig. 3 is a section along the line 3—3 of Figs. 1 and 2. Fig. 4 is an enlarged plan view of a portion of the step by step shifting mechanism. Fig. 5 is a section along the line 5—5 of Fig. 4. Fig. 6 is a perspective view of a portion of the plate holding device. Fig. 7 is a section along the line 7—7 of Fig. 6. Fig. 8 is a section along the line 8—8 of Fig. 6. Fig. 9 is a perspective view of a portion of the clamping means. Fig. 10 is a view of a portion of a printed plate. Fig. 11 is a view of a modified form of a portion of the plate shifting mechanism. Fig. 12 is a section through another modified form of the device shown in Fig. 11, and Fig. 13 is a plan view of a modified form of holding means for the sensitized plate.

In carrying out my invention I provide a suitable bed plate 1 which is preferably made of metal and which is provided with legs 2. Secured to the under side of the bed plate is a U-shaped bracket 3 which is provided with slotted extensions 4 at each end thereof arranged to receive the slotted ends 5 of a cross bar 6, see Fig. 9. The central portion of this cross bar 6 bears a pair of upstanding bracket members 7, see Fig. 3, in which the cylindrical ends 8 of a cam member 9 are journaled. As will be seen from Fig. 2, this cam member is circular, but the journaled portions 8 are disposed off center. The edge of the cam member 9 is arranged to bear upon a plunger 10 which passes through the body portion of the cross bar 6 and which bears a swiveled head 11 faced with some resilient material 12 such as rubber or the like. A handle 13 is provided for manipulating the cam 9. It will be seen that on turning the handle in the direction indicated by the curved arrow in Fig. 2, the plunger 10 with its resiliently faced head 11 will be forced downwardly against the plate 14. At diagonally opposite corners of the head 11, rods 15 pass through the plate 6 and are connected to the head, springs 16 being provided above the plate, these springs exerting tension on the rod 15, so as to cause the plate 11 to be lifted when the handle 13 is thrown toward the dotted line position shown in Fig. 2.

The plate 1 is provided with an opening 17, see Fig. 2, this opening being bordered by shoulders 18 upon which the transparent negative supporting plate 19 rests. The base plate 1 is provided with upwardly extending flanges 20 flanked by grooves 21. The negative 22 may be adjusted and held in its adjusted position by means of set screws 23, which pass through the flanges 20 and engage the edges of the negative. The purpose of the groove 21 is to provide room for the heads of the set screws so that the latter may be manipulated with the fingers.

The means for holding the sensitive plate 14 is best shown in Fig. 6. In this figure it will be observed that a rod 24 is provided having secured at one end thereof a laterally extending grooved strip 25. A similar strip 26 is adjustably secured to the rod 24 by means of a set screw 27. A cross strip 28 may be secured to both the strips 25 and 26 by means of set screws 29. Openings 30 are provided in the members 25, 26, and 28 so that these members may be moved to accommodate plates of varying sizes. The plate 14 is held in the grooved strips 25 and 26 by means of set screws 31, see Fig. 8. It will be observed that the under portion of the strips 25 and 26 are provided with roller bearings 32. Obviously the frame 25, 26, 28 can be detached from the rod 24 and removed from the machine.

Referring now to Fig. 1, it will be seen that the rod 24 is carried by standards 33, these standards being arranged to permit a slidable movement of the rod 24 relatively to the standards. The standards in turn are carried by a plate 34 which is secured at one end to a rod 35 slidably mounted in the standard 36 carried by the base plate 1. The rod 24 is provided with a handle 37 which is loosely mounted on the rod and is normally kept by the spring 38 against one of the standards 33. A locking member 39 through which the rod 24 passes, prevents the retraction of the rod while permitting its advance when the handle 37 is pushed against the spring 38. The limit of movement of the handle 37 is gaged by the adjustable stop member 40, a scale 41 being provided for determining the exact amount of movement of the arm 37.

The rod 35 is provided with an arm or handle 42 which grips the rod when moved toward the adjustable stop members 43, see Fig. 4. A locking member 44 is provided which prevents the retraction of the rod. As will be seen from Fig. 5, the end of the arm 42 is pivotally connected with a plate 46 which is slotted to receive guide screws 47. A pin 48 is disposed in the plate 1 and to this pin is attached a spring 49. One end of the spring is attached to the plate 46 so as to retract the plate when pressure is relieved from the arm or handle 42. This arm has upward projections which straddle the rod, 35 and effect the same gripping action of the arm on the rod. The plate 46 has a lateral extension 45 carrying an index 51 coacting with a stationary scale 50 and said stop 43 adjustable along the scale to arrest the index in any desired position.

From the foregoing description of the various parts of the device, the operation thereof will be readily understood. A negative 22 is made and is placed in position upon the supporting plate 19 just above the opening 17. As will be seen from the drawings an incandescent light 53 is disposed so that its light shines directly on the plate 19 bearing the negative. When the negative is smaller than the aperture 17, as in the illustrated instance, the uncovered margin of the glass supporting plate 19 may be rendered opaque by any suitable or usual procedure, such as applying opaque cloth, paper or paint. The metal plate having a sensitized surface is now placed in the frame which is adjusted in the manner already described to fit the plate, the position of the plate being such that the negative is preferably located adjacent one corner of the plate, as shown in Fig. 1. The handle 13 of the clamping device is now swung to the full line position shown in Fig. 2, thus clamping the plate down upon the negative, when an exposure may be made by turning on the light. After due exposure the light is turned off and the handle 13 is swung to the dotted line position shown in Fig. 2, thus unclamping the plate. It will be noted that the plates, or rather the frame which bears the plate, is lifted up by a counterweight W at the end of a flexible cable *w*, which passes over a pulley P so that whenever the head 11 of the clamping member is retracted, the sensitized metal plate will be lifted upwardly clear of the negative. The cam handle 13 may be raised very slightly, enough to relieve contact between the negative and plate sufficient to permit shifting the plate, but not enough to admit an objectionable amount of light beneath the plate to affect its sensitized surface. The handle 37 is now moved until it comes into engagement with the stop member 40. This may be repeated for two or more times, each movement moving the plate 14 forward until the desired position is reached, when the negative is again clamped to the plate and an exposure taken. When the end of the row of exposure is reached, then the handle 42 may be manipulated to bring the plate into position for making another row of prints. The locking device 39 may then be released so that the rod 24 may be retracted to its original position to start the next row of prints. Obviously it is immaterial whether the prints are made in rows or in columns, the result being the same.

One advantage of this device over those in which the negative and the source of light are shifted, is that the plate may be shifted without any danger of interfering with the electrical connection, since there are no electric wires which are moved. Furthermore, it is easier to shift a flat plate than it is to shift the lamp and the negative and the means for holding the negative; which results in much less time being necessary for manipulation. The provision of the arms 42 and 37 permits the plate to be shifted rapidly to the desired position and this position is gaged to a very small fraction of an inch which is sufficiently accurate for all practical purposes such as the making of metal tags with inscriptions or data upon them, or the making of bottle caps having designs.

Where it is necessary to secure a higher degree of accuracy in the location of the prints I may use a modified form shown in Fig. 11. In this form, the rod 35 is provided with an arm 60 which has a stationary clamping member 61 and a movable clamping member 62, the latter being manipulated by a set screw 63. A handle 64 is also provided. In this form of the device, the set screw 63 is tightened against the rod 35 and the handle moved forward until it comes to a stop member such as that shown at 43 in Fig. 4, when the clamping members 61 and 62 may be loosened by reversing the motion of the set screws 63, thus permitting the arm 60 to be brought back to its original position against another stop member. While this will result in greater accuracy, it will at the same time of course entail more labor, but in certain instances the expenditure of labor will be paid for by the accuracy which is secured. As stated, however, for all ordinary purposes the devices already described are sufficient. Instead of having the form shown in Fig. 11, I may use the form shown in Fig. 12, in which the rod 35 is clamped to the block 66 by means of a screw 67.

In Fig. 13 I have shown a modified form of means for holding the sensitized plate 14. This consists of a frame 70 having set screws 71 by means of which the position of the plate 14 may be determined and which will also hold the plate rigidly in position.

When desired to increase the intensity of the printing light I may employ a light-reflecting housing 52, which however may ordinarily be removed, and in order to prevent the heat from the electric lamp 53 from injuring the negative, I may provide a fan 72 which forces air directly on the parts, thus tending to cool the latter.

It will be noted that the negative-receiving space bordered by the flanges 20 will accommodate a negative either larger or smaller than that shown, without impairing the adjusting and retaining facility of the screws 23, and in any event these flanges shield from light the portions of the plate extending beyond them so that in making a given exposure said extensive portions of the plate surface will not be affected by the light, even when printing from a negative smaller than the aperture 17 and omitting the ordinary procedure for rendering opaque the uncovered margin of the supporting glass 19. Also the opaque bed-plate 1 acts as a light-intercepting shield to prevent exposing those portions of the sensitized plate not being printed, to stray light from the lamp 53 or from other sources. The sensitized plate is itself opaque so that its sensitized surface cannot be illumined by extraneous light from above. The sensitized plates to be employed with this device are not exceedingly sensitive, and are too slow to be materially affected by extraneous light which may filter between the bed-plate 1 and the plate holding frame or edge of the sensitized plate, or which may filter beneath the bed-plate and thence through its aperture 17 when the lamp housing 52 is not employed. The bed-plate legs 2 may be so short as to maintain comparative darkness beneath the bed-plate. Direct exposure of the sensitized plate to improper illumination is prevented and the plate is sufficiently shielded to permit of printing in a room ordinarily lighted. To thus print without recourse to a dark room or other extraneous protection is a great commercial advantage.

In the following claims the designation "sensitized plate" is employed in generic sense to include all like or equivalent devices having a sensitized surface, and the claims comprehend all structural modifications and adaptations within the spirit, principles and scope of the invention.

I claim:

1. In a device for printing sensitized plates, a stationary source of light, a stationary negative disposed in the field of said source of light, and means for shifting a sensitized plate to different printing positions relative to said stationary negative.

2. In a device for printing sensitized plates, a stationary source of light, a stationary negative disposed in the field of said source of light, means for shifting a sensitized plate to different printing positions relative to said stationary negative, and means for clamping said plate to said negative in each printing position.

3. In a device for printing, a stationary source of light, a stationary negative holder disposed adjacent to said source of light, a negative carried by said stationary negative holder, means for adjustably securing said negative within the holder, and means for moving a sensitized plate with respect to the negative holder and means for clamping said sensitized plate above said negative in any of the positions of the plate.

4. In a device for printing, a stationary source of light, a stationary negative holder disposed adjacent to said source of light, a negative carried by said stationary negative holder, means for adjustably securing said negative within the holder, means for moving a sensitized plate with respect to the negative holder and means for clamping said sensitized plate above said negative in any of the positions of the plate, and means for automatically raising said plate from the negative when the plate is unclamped.

5. In a device for printing, a stationary source of light, a stationary negative holder disposed adjacent to said source of light, a negative carried by said stationary negative holder, means for adjustably securing said negative within the holder, means for moving a sensitized plate with respect to the negative holder, means for clamping said sensitized plate above said negative in any of the positions of the plate, and means for automatically raising said plate from the negative when the plate is unclamped, the last said means comprising a weight and pulley and a cord connecting said weight at one end and said plate at the other and arranged to pass over said pulley.

6. In a device for printing, a stationary base having an opening, a stationary source of light disposed adjacent to said opening, a stationary transparent plate arranged to cover the opening, a stationary negative carried by said transparent plate, a frame movable relative to said base and adapted to carry a sensitized plate and means for clamping said sensitized plate upon said negative.

7. In a device for printing, a stationary base having an opening, a stationary source of light disposed adjacent to said opening, a stationary transparent plate arranged to cover the opening, a stationary negative carried by said transparent plate, a frame movable relative to said base and adapted to carry a sensitized plate, and means for clamping said sensitized plate upon said negative, said last named means comprising a cross bar disposed above said base, means for connecting said cross bar with the base, a plunger having a head arranged to engage said sensitized plate, and means for forcing said plunger toward the plate and for locking it in engagement with the plate.

8. In a device for printing, a stationary base having an opening, a stationary source of light disposed adjacent to said opening, a stationary transparent plate arranged to cover the opening, a stationary negative carried by said transparent plate, a frame movable relative to said base and adapted to carry a sensitized plate, and means for clamping said sensitized plate upon said negative, said last-named means comprising: a cross bar disposed above said base, means for connecting said cross bar with the base, a plunger having a head arranged to engage said sensitized plate, and a cam arranged to engage said plunger for moving it toward the plate and for locking it in its shifted position.

9. In a device for printing sensitized plates, a stationary solid base having an opening, a stationary transparent plate arranged to cover the opening, a stationary source of light disposed adjacent to said opening on one side of the transparent plate, a stationary negative carried by said transparent plate, means for moving a sensitized plate laterally with respect to the stationary negative, and means for forcing said sensitized plate toward said stationary plate and into engagement with said stationary negative.

10. In a device for printing sensitized plates, a stationary horizontal solid base having an opening, a stationary transparent plate arranged to cover the opening, a stationary source of light disposed adjacent to said opening on one side of the transparent plate, a stationary negative carried by said transparent plate, means for moving a sensitized plate laterally with respect to the stationary negative, and means for forcing said sensitized plate toward said stationary plate and into engagement with said stationary negative.

11. In a device for printing sensitized plates, a stationary horizontal solid base having an opening, a stationary transparent plate arranged to cover the opening, a stationary source of light disposed adjacent to said opening on one side of the transparent plate, a stationary negative carried by said transparent plate, means for moving a sensitized plate laterally with respect to the stationary negative, means disposed above said horizontal stationary base for forcing said sensitized plate downwardly toward said base into engagement with said stationary negative, and for locking the parts in engagement.

12. In a device for multiple printing on sensitized plates, means for holding a relatively small negative and a relatively large sensitized plate in printing juxtaposition in a plurality of relative positions to transmit duplicate prints to the plate in successive exposures, a source of light arranged to transmit light through the negative and to a limited portion of the sensitized plate including its surface in contact with the negative for a given exposure, and light-intercepting means arranged to intercept transmission of light to those portions of the sensitized plate extending beyond said limited portion including the print-receiving surface of the given exposure.

13. In a device for multiple printing on sensitized plates, means for holding a relatively small negative and a relatively large sensitized plate in printing juxtaposition and for shifting their relative position to repeatedly duplicate the print of said negative on said plate, means for illuminating the negative, and means for shielding from light during one exposure portions of the sensitized surface of the plate which extend beyond the negative and upon which the duplicate exposures are to be made.

14. In a device for multiple printing on sensitized plates, a light-intercepting shield with an aperture, a source of light on one side of the shield, means for holding a negative in the path of light through said aperture, and means for holding a sensitized plate on the other side of the shield in printing juxtaposition with said negative and means for shifting the relative position of the plate and negative.

15. In a device for multiple printing on sensitized plates, a light-intercepting shield with an aperture, a source of light on one side of said shield, means for holding a negative in the path of light passing through the aperture, a plate-holding frame on the opposite side of said shield from said source of light adapted to carry a sensitized plate in printing juxtaposition with a negative held by said negative-holding means, and means for shifting said plate-holding frame by uniform degrees in two directions normal to each other.

16. In a device for multiple printing on sensitized plates, means for holding a negative in fixed position, a source of light disposed at one side of the negative, means for holding a sensitized plate in printing juxtaposition on said negative and for moving said plate to and from said negative and also laterally with respect to the negative, and light-intercepting means between said source of light and portions of the plate not in juxtaposition on the negative.

In testimony whereof I have affixed my signature.

ASHLEY GUY OGDEN.